United States Patent [19]
Chen et al.

[11] Patent Number: 5,834,580
[45] Date of Patent: Nov. 10, 1998

[54] POLYURETHANES PREPARED FROM AMIDE LINKAGES-CONTAINING DIAMINE CHAIN EXTENDER

[75] Inventors: Wei-Liang Chen, Hsinchu; Kai-Rhen Shiao, Miao-Li Shiann, both of Taiwan

[73] Assignee: Industrial Technology Research Institute, Hsinchu, Taiwan

[21] Appl. No.: 536,219

[22] Filed: Sep. 29, 1995

[51] Int. Cl.⁶ .................................................. C08G 18/10
[52] U.S. Cl. .................................. 528/61; 528/64; 528/67
[58] Field of Search .................................. 528/61, 67, 64

[56] References Cited

U.S. PATENT DOCUMENTS

| | | | |
|---|---|---|---|
| 2,164,787 | 7/1939 | Rossander | 564/157 |
| 2,929,804 | 3/1960 | Steuber | 528/906 |
| 3,475,377 | 10/1969 | Rosendahl | 528/60 |
| 3,632,536 | 1/1972 | Iwakura | 528/60 |

FOREIGN PATENT DOCUMENTS 1962602  6/1971  Germany.

*Primary Examiner*—Rachel Gorr
*Attorney, Agent, or Firm*—Darby & Darby, P. C.

[57] ABSTRACT

Polyurethane elastic products prepared by a two-stage process are disclosed. In the first stage, polyols are reacted with diisocyanates to form prepolymers. The prepolymers are then reacted with diamine chain extenders which contain amide linkages, to form polyurethane elastic products.

12 Claims, 1 Drawing Sheet

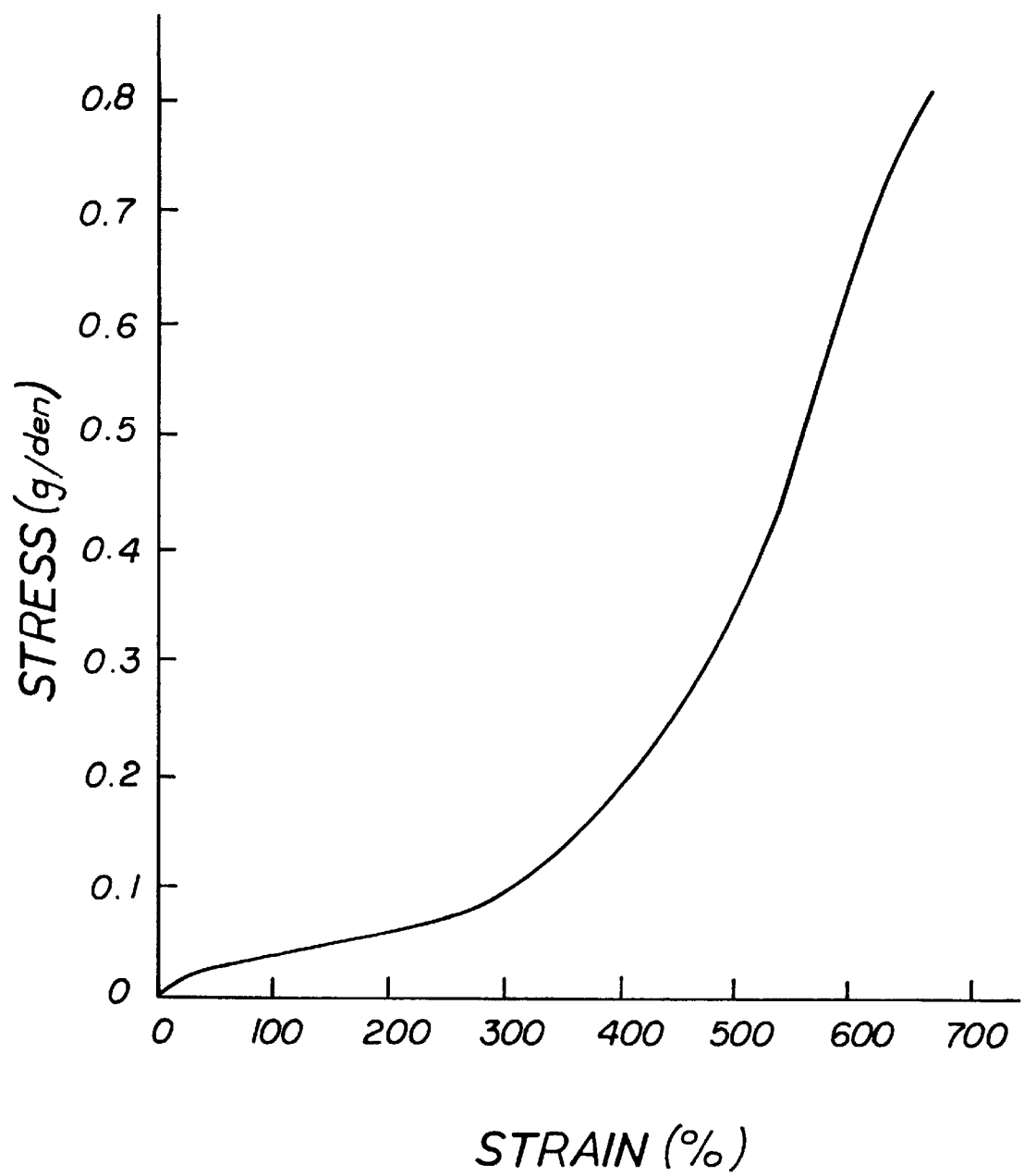

POLYURETHANES PREPARED FROM AMIDE LINKAGES-CONTAINING DIAMINE CHAIN EXTENDER

BACKGROUND OF THE INVENTION

The present invention relates to a polyurethane prepared from a diamine chain extender which contains amide linkages. The polyurethane is a polymeric elastomer suitable for the preparation of polyurethane products such as films, fibers and elastomers having high strength, elasticity, elongation and heat resistance.

Spandex polymers can be defined as any long-chain synthetic polymer composed of at least 85 percent by weight of a segmented polyurethane. Conventional Spandex is prepared by first synthesizing isocyanate prepolymer from diisocyanates and polyols (polyesters or polyethers), followed by reacting the prepolymer with chain extenders such as diamines or diols. The synthesized polymer contains crystalline and high melting hard segments, and noncrystalline and low melting soft segments. Hard segments can form connection points for networks by crystallization and intermolecular interactions, while the low glass transition temperature of the flexible, soft segments endows the products with elasticity.

Commercialized Spandex uses polyesters or polyether polyols having a molecular weight of about 2000 to form the soft segments, thus achieving a 350–500% elongation. For special uses which require higher elongation, polyesters or polyether polyols having molecular weight higher than 3500 are used. Although Spandex thus prepared has good elongation, its tenacity and modulus are low, thus making it unsuitable for being spun into fibers, since it has inferior elasticity and heat resistance.

On the other hand, lengthening the hard segments results in a reduction of elongation at break and an increase of fiber tenacity, but it simultaneously induces unstable, high viscous polymer solutions which are detrimental to the subsequent spinning process.

SUMMARY OF THE INVENTION

It is therefore an object of the invention to provide a polyurethane elastomer suitable for the preparation of polyurethane products having high strength, elasticity, elongation and heat resistance.

The above object is achieved by using a chain extender which contains amide linkages.

The chain extender has the structure:

$$NH_2-R_1-CONH-R-NHOC-R_2-NH_2 \quad (A)$$

wherein R is a substituted or nonsubstituted straight or branched chain $C_2$–$C_{12}$ alkylene, substituted or nonsubstituted $C_3$–$C_{12}$ cycloalkylene, or aromatic segments represented by the following general formulas I–IV:

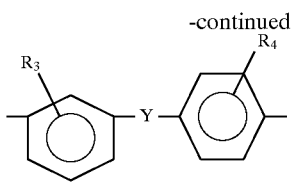

(I)

(II)

wherein Y is a single bond or $C_nH_{2n}$, where n represents 1 or 2, S, $SO_2$; $R_3$ and $R_4$ respectively represent halogen, $CH_3$, $CH_3O$, $C_2H_5O$ or H, and may be the same or different;

(III)

(IV)

wherein $R_5$, $R_6$, $R_7$ and $R_8$ represent respectively halogen, $C_1$–$C_6$ alkyl or H, and may be the same or different; $R_1$, and R2 are respectively aromatic segments represented by the following general formulas V–VI:

(V)

(VI)

wherein $R_9$ represents halogen, $C_1$–$C_6$ alkyl or H.

The substitutions on the above alkylene and cycloalkylene groups may be $C_1$–$C_6$ alkyl; $C_1$–$C_6$ alkoxy, $C_2$–$C_6$ acyl, halo or nitro. Preferred substituants are methyl, methoxy, acetoxy, nitro and chloro.

BRIEF DESCRIPTION OF THE DRAWING

The present invention can be more fully understood by reference to the following detailed descriptions and accompanying drawing, which form an integral part of this application.

The Figure is a stress-strain plot of the filament formed in Example 7.

DETAILED DESCRIPTION OF THE INVENTION

According to the invention, the polyurethane is prepared by a two-stage process. In the first stage, diisocyanates and polyols are prepolymerized in an organic solvent, such as N,N-dimethyl acetamide and N-methyl 2-pyrrolidone. It is essential that the molar ratio of NCO:OH be 2:1 to 4.5:1, preferably 2.15:1 to 4.2:1, most preferably 2.1:1 to 4:1. Catalysts can be added to the system to facilitate the prepolymerization reaction. The amount of the catalysts is in the range of 0.005–0.1 wt % based on total solution. In the second stage, the synthesized prepolymer is mixed and reacted with the diamine chain extenders solution to form high viscous solution. The resulting high viscous solution can then be processed into polyurethane films or polyurethane coated leathers, or spun into Spandex by dry or wet spinning method. The high viscous solution can also be premixed with at least 10 wt % of thermoplastic polyurethane, and then spun into Spandex by melt spinning.

To obtain polyurethane products having high elongation and elasticity, according to the invention, the polyols include various polyesters, polyethers and polycarbonates or their copolymers. Note that it is essential that the polyols of the invention do not include urethane segments to avoid an increase in the rigidity of the soft segments. The increase of rigidity usually will reduce the elongation and elasticity of the resulting polyurethane products. Also, if a copolymer is used, to obtain desirable properties, preferably the chain length of the carboxyl segments in the copolymer is limited. For example suitable carboxy segments are:

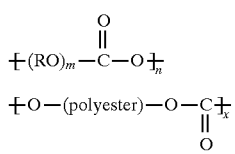

wherein m is preferably between 1 and 8, and x and n are between 1 and 40, preferably between 1 and 20. The most preferred polyols are polyether polyols and their copolymers. They should have a molecular weight not less than 500, preferably not less than 1000, most preferably not less than 2000. The preferred upper limit is 4800.

According to the invention, the diisocyanates can be symmetrical aromatic diisocyanates, aliphatic diisocyanates, cyclic aliphatic diisocyanates or their mixtures in different mixing ratios. Among them, symmetrical aromatic disisocyanates, such as 4,4'-methylene bis(4-phenylisocyanate), and cyclic aliphatic diisocyanates, such as 1,4-cyclohexyl diisocyanate, are preferred. An example of the mixed diisocyanate is a mixture composed of at least 85 wt % of 4,4'-methylene bis(4-phenylisocyanate) and 1,6-hexamethylene diisocyante. Another preferred example is a mixture composed of at least 90 wt % of 4,4'-methylene bis(4-phenylisocyanate) and 1,4-cyclohexyl diisocyanate.

The chain extenders suitable for use in the invention are those depicted by formula (A) in the Summary section of this application. The chain extenders are prepared by stoichiometrically reacting selected diamines with substituted or nonsubstituted p- or m-nitrobenzoyl chlorides, followed by hydrogenation. Specific examples of these diamines are 4,4'-diaminodiphenyl methane, 4,4'-diaminodiphenyl ether, 4,4'-diaminodiphenyl sulfone, 3,3'-diochloro-4,4'-diaminodiphenylene methane, 3,3'-dimethyl-4,4'-diamino biphenyl, 4,4'-diamino biphenyl, 3,3' dichloro-4,4'-diamino biphenyl; tetrachloro phenylene diamine, 3,3'-dimethoxy-4,4'-diamino biphenyl, phenylene diamine, 3,4'-diamino diphenyl sulfone, 3,3'-dicacetoxy-4,4'-diaminobiphenyl, dimethylphenylene diamine and 3,4'-diaminodiphenyl ether. Among them, diamines containing $SO_2$- linkages or chloro substituents are preferred. Note that a mixture of p- and m-nitrobenzoyl chlorides can also be used. Chain extenders in which R is alkylene or cycloalkylene are synthesized by interfacial condensation in a suitable solvent, for example, chloroalkanes, chloroalkenes, tetrahydrofurans, benzenes, phenyl alkanes (toluenes), alkanes (n-hexanes), propylene oxides, cycloketones, cycloalkanes, and cycloalkenes. The reaction is preferably carried out in alkanes, cycloalkanes, or phenylalkanes. Chain extenders in which R is an aromatic segment are prepared by low temperature solution process at a temperature less than 30° C., preferably less than 20° C., most preferably between 0° and 10° C.

The invention is more specifically described by the following illustrative examples.

EXAMPLE 1

Preparation of diamine chain extender 1 mole of hexamethylene diamine was dissolved in 2 moles of potassium hydroxide. The resulting solution was then mixed with a solution of 2.05 moles of p-nitrobenzoyl chloride in toluene and agitated at 2000 rpm at 20° C. for about 40 minutes followed by filtration. The product was washed with water and ether, filtered and vacuum dried to give 395 g of product A. The melting point was 136–138° C. and the yield was 96%

To a solution of 0.5 mole of product A in dimethyl ethylene amine, was added 10% of Pd/C (0.2 g). The mixture was subjected to hydrogenation at 75–80° C. under a 50–60 psi hydrogen atmosphere. When the hydrogenation was completed, the solution was cooled to room temperature, the solvent was removed by filtration and the solid was poured into water for precipitation. The precipitate was then washed with tetrahydrofuran and ethanol completely, collected and dried to give 154 g of the titled final diamine product B. The melting point was 152°–154° C. and the yield was 89%.

Preparation of polyurethane

To 250 g of polyether glycol (molecular weight: 2000 g/mole) (OH:56 meq/mole) was added 78.1 g of 4,4-methylene bis(4-phenyl isocyanate) and 300 cc of dimethyl acetamide, and stirred.

After dissolution, the solution was reacted at 65° C. for 130 minutes until the content of the terminal -NCO groups was 2.3%. The molar ratio of NCO/OH of the resulting prepolymer was 2.5:1.

66 g of diamine product B was dissolved in dimethyl acetamide (700 cc). The solution was then poured into the prepolymer, and the mixture was stirred at 80° C. until a uniform viscous liquid was formed. The solid content of the viscous liquid was about 29 wt %. The inherent viscosity ($\eta_{inh}$) of the viscous liquid and other characteristics are summarized in Table 1.

EXAMPLES 2–6

The same procedures as in Example 1 were repeated except that the raw materials for the preparation of diamine chain extenders, and the $OH:NCO:NH_2$ were different. The raw materials for preparing the chain extenders of Examples 2–6, the $OH:NCO:NH_2$ molar ratio, and the characteristics of the resulting polyurethane are respectively summarized in Table 1.

TABLE 1

| Example | Chain extender diamine | nitrobenzoyl chloride | OH:NCO:$NH_2$ (molar ratio) | $\eta_{inh}$** |
|---|---|---|---|---|
| 1 | hexamethylene diamine | p- | 1:2.5:1.5 | 0.80 |
| 2 | hexamethylene diamine | p-,m-* | 1:2.5:1.5 | 0.71 |
| 3 | 2-methyl pentadiamine | p- | 1:2.5:1.5 | 0.59 |
| 4 | 4,4'-diaminodiphenyl sulfone | p- | 1:3.2:2.05 | 0.78 |
| 5 | 4,4'-diaminodiphenyl sulfone | p- | 1:2.5:1.5 | 0.65 |
| 6 | 4,4'-diaminodiphenyl | p-,m-* | 1:2.5:1.35 | 0.63 |

TABLE 1-continued

| Example | Chain extender diamine sulfone | nitrobenzoyl chloride | OH:NCO:NH$_2$ (molar ratio) | $\eta_{inh}$** |
|---|---|---|---|---|

*The molar ratio of two nitrobenzoyl chlorides is 1:1
** Measured at a polymer concentration (c) of 0.5 g/dL in dimethyl acetamide at 30 ± −0.1° C.

EXAMPLE 7

The high viscous liquid obtained in Example 5 was diluted with dimethyl acetamide to form a dope having a viscosity of 500–530 poise, and extruded through a spinneret having a 0.12 mm capillary hole at 60° C., into a 15° C. water/DMAc coagulation bath to form a filament. The properties of the obtained filament are summarized in Table 2. The stress strain plot of the filament is shown in the Figure.

TABLE 2

| tenacity (g/den) | elongation at break % | elastic recovery % | residual elongation (%) | tenacity at 100% elongation (g/den) |
|---|---|---|---|---|
| 0.75 | 654 | 95 | 11 | 0.04 |

The tenacity was measured in accordance with DIN 53815. The elastic recovery is instantaneous recovery at an elongation at 300%. The residual elongation is the elongation after 5 times of continuous elongating conducted at 60 second intervals.

What is claimed is:

1. A polyurethane prepared from:

(a) a diisocyanate;
(b) a polyol; and
(c) a diamine chain extender containing amide linkages having the structure:

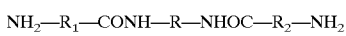
NH$_2$—R$_1$—CONH—R—NHOC—R$_2$—NH$_2$ wherein R is an aromatic segment represented by formulas I and II:

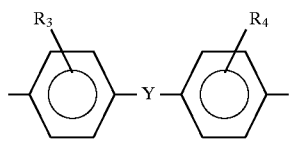
(I)

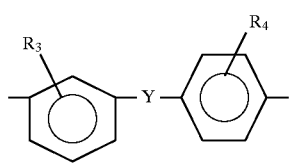
(II)

wherein Y is a single bond or C$_n$H$_{2n}$, O, S, SO$_2$; R$_3$ represents halogen, CH$_3$O, or C$_2$H$_5$O and R$_4$ represents halogen, CH$_3$, CH$_3$O, C$_2$H$_5$O or H;

wherein n represents 1 or 2; and wherein R$_1$ and R$_2$ are respectively aromatic segments represented by formulas V–VI:

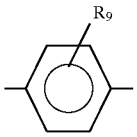
(V)

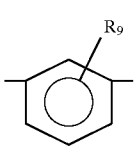
(VI)

wherein R$_9$ represents halogen, C$_1$–C$_6$ alkyl or H.

2. The polyurethane of claim 1, wherein said polyol is a compound selected from the group consisting of polyester, polyether, polycarbonate and the copolymer thereof.

3. The polyurethane of claim 2, wherein said polyol is free of urethane segments.

4. The polyurethane of claim 2, wherein said polyol is a copolymer having carboxy segments represented by

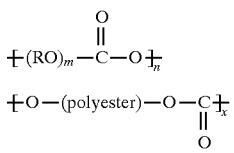

wherein m is between 1 and 8, x and n are between 1 and 40, and R is alleylene.

5. The polyurethane of claim 2, wherein the molecular weight of said polyol is greater than 1000.

6. The polyurethane of claim 5, wherein the molecular weight of said polyol is between 1000 and 4800.

7. The polyurethane of claim 1, wherein said diisocyanate is a compound selected from the group consisting of aromatic diisocyanate, aliphatic diisocyanate, cyclic aliphatic diisocyanate and mixtures thereof.

8. The polyurethane of claim 7, wherein said diisocyanate is a mixture of 4,4'-methylene bis(4-phenyl isocyanate) and 1,6-hexamethylene diisocyanate.

9. The polyurethane of claim 8, wherein said 4,4'-methylene bis (4-phenyl isocyanate) constitutes at least 85% of the mixture.

10. The polyurethane of claim 7, wherein said diisocyanate is a mixture of 4,4'-methylene bis(4-phenyl isocyanate) and 1,4-cyclohexyl diisocyanate.

11. The polyurethane of claim 10, wherein said 4,4'-methylene bis (4-phenyl isocyanate) constitutes at least 90% of the mixture.

12. A process for preparing a polyurethane which comprises reacting a polyol and a diisocyanate to prepare a prepolymer and thereafter reacting the prepolymer with a diamine chain extender having the structure:

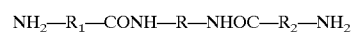
NH$_2$—R$_1$—CONH—R—NHOC—R$_2$—NH$_2$ wherein R is an aromatic segments represented by formulas I and II:

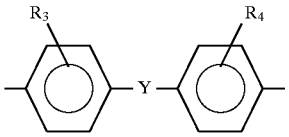
(I)

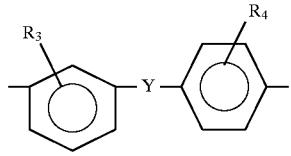 (II)
wherein Y is a single bond or $C_nH_{2n}$, O, S, $SO_2$; $R_3$ represents halogen, $CH_3O$, or $C_2H_5O$ and $R_4$ halogen, $CH_3$, $CH_3O$, $C_2H_5O$ or H; wherein n represents 1 or 2; and wherein $R_1$ and $R_2$ are respectively aromatic segments represented by formulas V–VI:
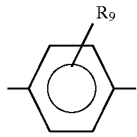 (V)
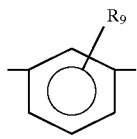 (VI)
wherein $R_9$ represents halogen, $C_1$–$C_6$ alkyl or H.
* * * * *